R. BOYACK.
Flax Brake.
No. 11,825.
Patented Oct. 24, 1854.
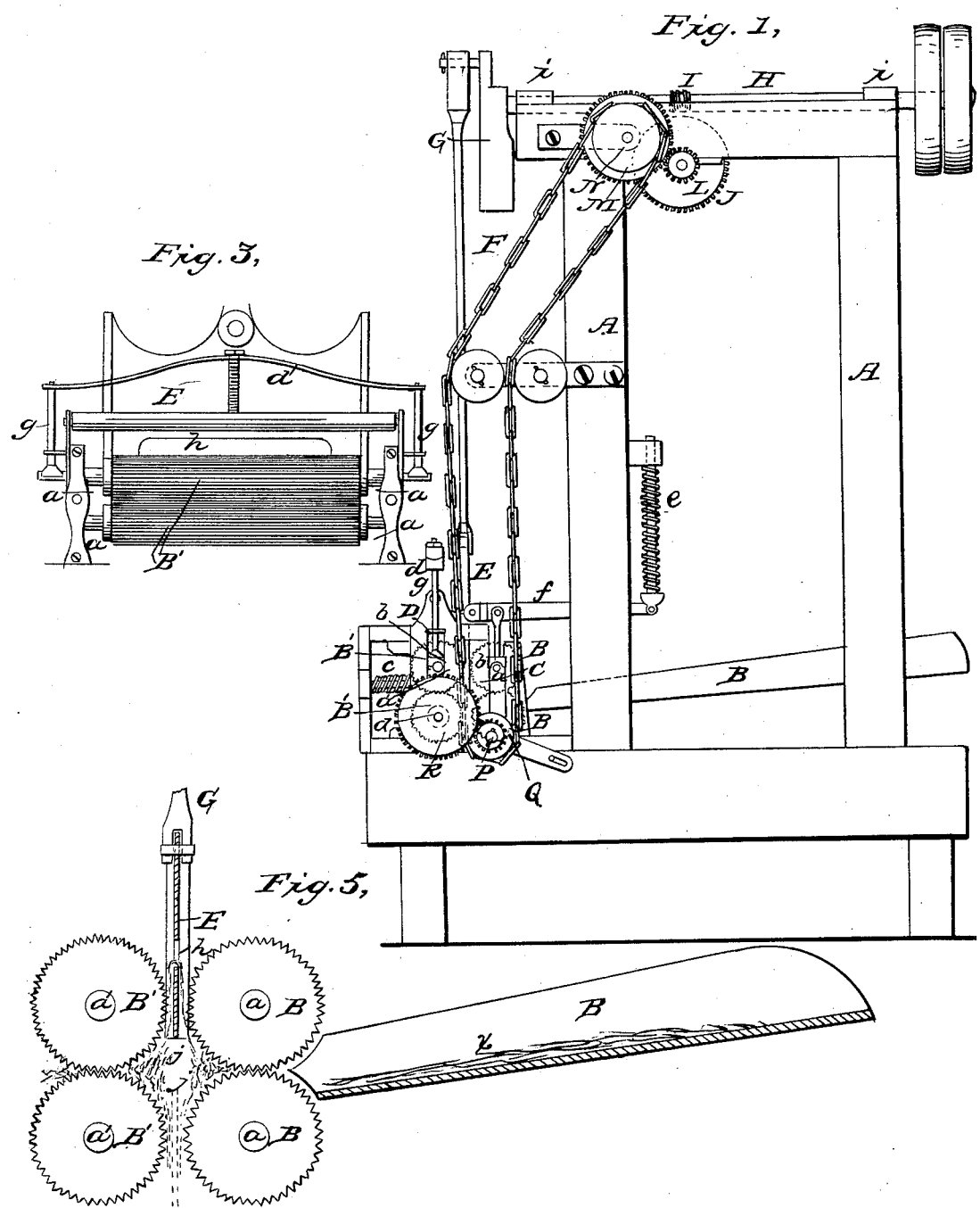

UNITED STATES PATENT OFFICE.

ROBERT BOYACK, OF POUGHKEEPSIE, NEW YORK.

IMPROVEMENT IN MACHINERY FOR SOFTENING HEMP AND FLAX.

Specification forming part of Letters Patent No. 11,825, dated October 24, 1854.

*To all whom it may concern:*

Be it known that I, ROBERT BOYACK, of Poughkeepsie, in the county of Dutchess and State of New York, have invented a new and Improved Machine for Softening Flax; and I do hereby declare that the following is a full, clear, and exact description of the same, reference being had to the annexed drawings, making a part of this specification, in which—

Figure 1 is a side elevation of my improved machine. Fig. 2 is a transverse vertical section of the fluted rollers, reciprocating plates, and feed-trough. Fig. 3 is a front view of the outer pair of fluted rollers and the reciprocating plates.

Similar letters of reference indicate corresponding parts in the several figures.

This invention relates to a new and improved machine for softening flax, hemp, and other fibrous substances; and it consists in having a vertical reciprocating plate having a slot through it and working between two pairs of fluted rollers. The flax or hemp to be operated upon and softened passes from a feed-trough between one pair of the fluted rollers, and through the slot in the reciprocating plate, and thence through the other pair of fluted rollers; and as the reciprocating plate operates, the flax is subjected to the necessary friction in order to render it soft and pliable without having its fiber cut or in the least injured. This will be fully hereinafter explained.

To enable others skilled in the art to make and use my invention, I will proceed to describe its construction and operation.

A represents a frame, constructed in any proper manner, so as to support the working parts.

B, Figs. 1 and 2, is an inclined feed-trough placed or secured in the frame A, as shown in Fig. 1, and B B B' B' are two pairs of fluted rollers placed at the front part of the frame A. The axes $a$ of the fluted rollers B B work in bearings $b$, which are secured in a small frame, C, which is stationary or immovable, while the axes $a'$ of the other pair of fluted rollers, B' B', have their bearings in a frame, D, which is allowed to vibrate or move horizontally outward, said frame D being controlled by springs $c$, one of which is shown in Fig. 1. The upper roller of each pair is kept firmly upon the lower one by springs $d$ $e$, the pressure of the spring $e$ of the inner pair of rollers, B, being transmitted to the upper roller thereof by means of a lever, $f$, as shown in Fig. 1. The pressure of the spring $d$ of the other pair of rollers is communicated directly to the upper roller thereof by means of uprights $g$ $g$. (See Figs. 1 and 2.)

E is a reciprocating plate, having a slot, $h$, through it, as shown in Figs. 2 and 3. This plate is connected by a rod, F, to a crank, G, at one end of a shaft, H, which works in bearings $i$ on the upper part of the frame A, as shown in Fig. 1. The plate E works between the two pairs of fluted rollers B B B' B', sufficient space being allowed between the two pairs of rollers, as shown in Fig. 2. The plate E should correspond in width to the length of the rollers, as shown in Fig. 3.

On the shaft H there is a screw, I, which gears into a worm-wheel, J, placed on a transverse shaft, K, said shaft K having pinions L L, one at each end, which pinions gear into toothed wheels M M, one at each side of the upper part of the frame A, (see Fig. 1,) in which the pinion and toothed wheel at one side of the frame are shown.

Attached to the axes of the toothed wheels M M are pulleys N N, around which chains O O pass, said chains also passing around pulleys P P at the lower part of the frame A. On the axes of the pulleys P P are pinions Q Q, which gear into toothed wheels R R. One wheel on each of the axes of the two lower fluted rollers, one of the pinions Q, and also one of the pulleys P and toothed wheels R are shown in Fig. 1, the others being on the opposite side of the frame A.

Operation: The flax to be operated upon is placed in the feed-trough B, and motion is given the fluted rollers B B B' B' and reciprocating plate E by the rotating of the shaft H and crank G. The flax is passed between the two rollers B B, through the slot $h$ in the plate E, and then between the two rollers B' B', as shown in Fig. 2, X representing the flax. The chains O O cause the fluted rollers to rotate, it being understood that the rollers of each pair gear into each other. The crank G gives the reciprocating motion to the plate E. The motion of the fluted rollers is quite slow compared with the reciprocating motion of the plate E, and both pairs of rollers have the same motion or rotate with equal speed. As the reciprocating plate operates, the flax on each side of the plate E is rubbed against the flax that accumulates in the recesses or cavities $j$, formed by the convexity of the rollers, and between each pair, as clearly shown in Fig. 2. The flax therefore does not come in contact with the fluted rollers as the plate is operated, but one portion of the flax is rubbed against another portion of it. The fluted rollers are only in contact with the flax at the junction of each pair, and feed the flax slowly through the slot in the plate. By the above arrangement the flax is made pliable and soft, sufficient heat is produced by friction to soften the resinous substance in the flax, and the fiber is not cut nor injured in any way.

I am aware that fluted rollers alone have been previously used for the same purpose; but in order to create sufficient heat by friction, the rollers require to be driven with considerable speed, and the fibers of the flax are much cut and injured.

I do not claim, therefore, the fluted rollers separately, for they have been previously used; but

What I claim as new, and desire to secure by Letters Patent, is—

Softening flax, hemp, &c., by means of a reciprocating plate, E, having a slot, $h$, through it, and working between two pairs of fluted rollers, B B B′ B′, the flax or hemp passing between the two pairs of rollers and through the slot in the plate, and operated upon by the plate and rollers, as herein shown and described.

ROBERT BOYACK.

Witnesses:
S. H. WALES,
JNO. W. HAMILTON.